United States Patent Office 3,345,413
Patented Oct. 3, 1967

3,345,413
PROCESS FOR PURIFYING A PHENYLENEDIAMINE
Alfred H. Pagano, Newark, Del., and Louis Spiegler, Woodbury, N.J., assignors to E. I. du Pont de Nemours and Company, Wilmington, Del., a corporation of Delaware
No Drawing. Filed Apr. 23, 1964, Ser. No. 362,181
8 Claims. (Cl. 260—582)

ABSTRACT OF THE DISCLOSURE

Process for freeing meta- and ortho-phenylenediamine from objectionable trace quantities of para-phenylenediamine by treating the original mixture with a Group I-A or II-A metal ferricyanide, and recovering the purified meta- and ortho-phenylenediamine.

---

This application is a continuation-in-part of copending application Serial No. 303,164, filed Aug. 19, 1963, and now abandoned.

This invention is directed to a process for purifying certain phenylenediamines, and more particularly to a process for freeing meta- and ortho-phenylenediamines and mixtures thereof from objectionable trace quantities of isomeric para-phenylenediamine, thereby rendering the purified meta- and ortho-phenylenediamines resistant to deterioration and discoloration in storage.

Both meta- and ortho-phenylenediamine are widely used intermediates for the preparation of dyes and other chemicals. When freshly prepared, they are white or almost white substances which discolor and deteriorate rapidly on standing.

The long-recognized problem of commercially producing meta- and ortho-phenylenediamines having high purity and having high stability against progressive discoloration and deterioration on exposure to ordinary atmospheric conditions has been difficult to overcome. It has thus far been considered uneconomical to obviate the occurrence of impurities in meta- and ortho-phenylenediamine by starting with rigorously purified intermediates. Rather, efforts to obtain pure and stable meta- and ortho-phenylenediamines have been directed to methods for removing accumulated impurities, especially the isomeric impurity para-phenylenediamine, from the phenylenediamines after manufacture. For example, the disclosures in U.S. Patents 2,946,821 and 2,946,822 attribute the instability of m-phenylenediamine towards air, heat and light to the presence of some of the o- and p-isomers of m-phenylenediamine and propose the use of certain heavy metal salts (chlorides, sulfates, acetates and nitrates) and compounds containing a chromium - containing anion (chromate, dichromate) to selectively complex, precipitate and thereby remove the objectionable isomeric phenylenediamines from the m-phenylenediamine product. The disclosure in U.S. 2,946,822, however, points out that the purification effected by a reagent such as alkali dichromate is not due to an oxidizing process as might be expected but to the preferential formation of readily separable addition compounds.

On the other hand, U.S. Patent 2,950,319 discloses that the o- and p-phenylenediamines are fully stable in their pure chemical state and suggests therefore that the deterioration of the m-phenylenediamine appears to be caused by some other by-product, in exceedingly small traces and as yet unknown, which may be catalyzing reactions leading to deterioration. They propose treatment of impure m-phenylenediamines with a surface active absorbent, which treatment effects some change in the composition of the m-phenylenediamine by some "entirely unknown" reaction, whereby the storage stability of the m-phenylenediamine is increased.

Still further, U.S. Patent 2,971,029 suggests that aromatic diamines, such as m-phenylenediamine, which tend to oxidatively discolor, can be stabilized against atmospheric oxidation and deterioration during storage by incorporating therein a small amount of a stannous halide as an antioxidant. Such expedient, however, has the obvious drawback of introducing a foreign substance whose presence in such phenylenediamines may be undesirable in certain end applications of the phenylenediamine intermediate.

It is apparent, from the foregoing proposed diverse methods and theories for stabilizing phenylenediamines, that the causes of the instability of phenylenediamines under ordinary atmospheric conditions are still somewhat obscure and elusive.

It is, therefore, an object of this invention to provide a novel and efficient process for purifying and stabilizing both meta-phenylenediamine and ortho-phenylenediamine.

It is another object of this invention to provide a novel process for removing the para-phenylenediamine isomer contaminant from both meta-phenylenediamine and ortho-phenylenediamine.

It is still another object of this invention to provide a novel process for improving the resistance of meta- and ortho-phenylenediamines against oxidative discoloration and deterioration under ordinary atmospheric conditions without introducing extraneous foreign material into the resulting meta- or ortho-phenylenediamine product.

It is a further object of this invention to simultaneously treat either predominantly meta-phenylenediamine or ortho-phenylenediamine containing objectionable though trace quantities of the contaminant para-phenylenediamine to effect both a significant reduction in the level of said contaminant and a significant improvement in the stability of said meta- or ortho-phenylenediamine against discoloration and deterioration during storage.

These and other objects will become apparent from the following description and claims.

More specifically, the present invention is directed to a novel process for purifying a phenylenediamine contaminated with from 0.05 to 1 mole percent para-phenylenediamine and normally tending to deteriorate under ordinary atmospheric conditions, which process comprises initimately contacting said phenylenediamine in the liquid phase at temperatures of from about 30 to 150° C. with a water-soluble Group I-A or II-A metal ferricyanide in an amount corresponding to about 0.5 to 10 moles of the ferricyanide for each mole of said para-phenylenediamine impurity, then separating the resultant purified phenylenediamine from the reaction mixture.

The process of this invention is a highly effective method for decreasing the para-phenylenediamine isomer content in both meta- and ortho-phenylenediamine, thereby increasing the purity of said phenylenediamine products. The process of this invention is also an effective method for enhancing the resistance of both meta- and ortho-phenylenediamine to discoloration and deterioration on exposure to ordinary atmospheric conditions. Although the effectiveness of ferricyanide in both these respects is not completely understood, it is believed dependent at least in part on the potential of the ferricyanide, in the presence of either m-phenylenediamine or o-phenylenediamine, to oxidatively convert the p-phenylenediamine contaminant to high molecular weight substantially involatile products from which either the m-phenylenediamine or the o-phenylenediamine can be readily separated by conventional techniques, such as distillation, solvent extraction and crystallization. While ferricyanide may owe its effectiveness in part to its oxidizing power, such inherent oxidation potential is not in and of itself a sufficient property for achieving both the decrease in p-isomer content and the enhancement in stability against further oxidative deterioration. This fact is illustrated by the example of hydrogen peroxide, which is known in the art as an oxidizing agent and as an effective agent to destroy p-phenylenediamine, yet the use of hydrogen peroxide in place of the ferricyanide of this invention does not provide a satisfactory product as regards storage stability despite the fact that it does effectively decrease the objectionable p-phenylenediamine isomer content in either the m-phenylenediamine product or the o-phenylenediamine product. It appears then that ferricyanide either is removing or inactivating still another, as yet unknown, impurity affecting the storage stability of m- and o-phenylenediamines or it is selectively destroying a known impurity such as the p-isomer without at the same time introducing still other impurities or creating other conditions which promote reactions leading to deterioration of the m- and o-phenylenediamines.

The process of this invention is simple to perform, requires no special equipment, and is adaptable to either batch or continuous operation. Conveniently the phenylenediamine to be purified, which normally tends to discolor and become tarry in storage, is (a) put in liquid form, as by melting and/or dissolving it in water or an inert solvent, (b) mixed with a water-soluble Group I-A or II-A metal ferricyanide in specified proportions, (c) held at 30–150° C., preferably with agitation to provide intimate contact of the reactants, until the desired degree of purification is achieved, and then (d) recovered in a purified condition by distillation of the reaction mixture, preferably at reduced pressures to minimize the possibility of thermal decomposition and yield loss of the product.

As heretofore stated, the exact causes of the storage instability of meta- and ortho-phenylenediamines are not fully understood; however, the tendency to discolor and deteriorate the aforementioned phenylenediamines appears invariably associated with the presence of the predominating isomeric impurity—p - phenylenediamine. Thus, the meta- and ortho-phenylenediamines to be treated in accordance with the method of this invention are obtained from commercial processes which will normally yield the diamine containing small amounts of the p-phenylenediamine. Meta- and ortho-phenylenediamines having not more than about 1 mole percent of the p-isomer are readily obtained by the ordinary techniques employed for isolation, irrespective of the particular preparative method used. It should be noted that the remaining isomer content in the isolated phenylenediamine will include both the contaminate p-phenylenediamine and small amounts of either the meta- or ortho-isomer depending on which phenylenediamine is to be purified and stabilized. For example, if m-phenylenediamine is to be stabilized by the process of the present invention, the isolated m-phenylenediamine, before the ferricyanide treatment, will usually contain as isomers trace amounts of both para- and ortho-phenylenediamine. Likewise, if ortho-phenylenediamine is to be treated, it will contain trace amounts of both para- and meta-phenylenediamines. Thus, it is an important discovery of this invention that the present ferricyanide treatment selectively destroys the p-isomer, which appears to be the real substance causing instability in the phenylenediamine. Thus, the amount of ferricyanide required to stabilize the phenylenediamine is based on the mole percent of p-phenylenediamine contaminant present and not on the total amount of isomeric impurities present.

While meta- and ortho-phenylenediamines containing more than about 1 mole percent p-phenylenediamine may be treated according to this invention, it is preferred, for economic reasons, to reduce such higher contaminant levels to below about 1 mole percent by conventional means such as distillation. Since it is difficult and costly to reduce the contaminant to below about 0.05 mole percent by ordinary means, the m- and o-phenylenediamines to be treated will normally contain from 0.05 to 1 mole percent, and more usually from 0.05 to 0.5 mole percent total p-phenylenediamine contaminant. An alternative method for expressing the quantity of impurities in the phenylenediamine to be purified is that each 100 moles of diamine contains from 0.05 to 1 mole of p-phenylenediamine contaminant.

This invention particularly applies to meta- and ortho-phenylenediamines obtained from commercial dinitrobenzene. Dinitrobenzene, ordinarily obtained by the nitration of nitrobenzene as fully described in U.S. Patent 2,946,822, may contain up to about 15% impurities, mainly isomeric o- and p-dinitrobenzenes. For the purposes of the present invention, such a dinitrobenzene mixture may be converted to the corresponding mixed phenylenediamine by catalytic hydrogenation or by chemical reduction, according to known methods. The resulting phenylenediamine composition is then distilled to remove the bulk of the normally occurring isomers and impurities to provide a m-phenylenediamine product having from about 0.05 to 1 mole percent p-isomer and little or no (0.1 mole percent or less) o-isomer.

The ortho-phenylenediamine by-product of the above distillation can be further purified by the process of the present invention. This by-product when subsequently redistilled gives an ortho-phenylenediamine product having about 0.5 to 1.0 mole percent para-phenylenediamine contaminant. Alternatively, the crude m-dinitrobenzene may itself be subjected to one or more purification procedures for the removal of isomers and impurities which is also described in U.S. Patent 2,946,822. As indicated in the art, m-phenylenediamine subsequently produced from pre-purified m-dinitrobenzene still contains appreciable amounts of impurities and is unsatisfactory from the standpoint of storage stability requirements.

The ferricyanide reagent of this invention will normally be the potassium or sodium salts, e.g., $K_3Fe(CN)_6$ and $Na_3Fe(CN)_6 \cdot H_2O$, because of their availability and relatively low cost. However, other Group I-A metal ferricyanides, such as the Li salt or mixtures of any two or more of such water-soluble salts, may be used. Similarly, there may be used a water-soluble salt of a Group II-A metal, i.e., alkaline-earth metal ferricyanide, as exemplified by the formula $Ca_3[Fe(CN)_6]_2 \cdot 12H_2O$. The quantity of the ferricyanide reagent used may vary widely depending on the level of impurities in the starting phenylenediamine, the degree of instability of the phenylenediamine, process conditions under which the purification is effected, such as temperature and duration of treatment, and the degree of purification desired. Usually the amount fo ferricyanide corresponds to 0.5 to 10 moles, preferably 1–4 moles, per mole of p-phenylenediamine present in the phenylenediamine to be treated. If the contaminant p-isomer content is not known with certainty, it usually suffices to employ from about 0.05 to 5 moles of ferricyanide for each 100 moles of phenylenediamine to be purified, preferably 0.1–1 mole/100 moles. Such quantities, in terms of $K_3Fe(CN)_6$, correspond to about 0.15 to 15 parts and 0.3 to 5 parts by weight of the ferricyanide for each 100 parts by weight of the phenylenediamine to be treated. Where feasible, the lower quantities of ferricyanide are employed since use of unnecessary excesses tend to lower the recoverable yield of the phenylenediamine product.

The Group I-A and Group II-A metal ferricyanides, normally solid substances, may be added to the reaction mixture as solids, usually in powdered form. However, it is more preferable to meter the Group I-A and II-A metal ferricyanides into the reaction zone dissolved or slurried in a carrier solvent, such as water, in amounts corresponding usually to about 1–50% by weight of ferricyanide. The carrier solvent, such as water, while not critical for operability, is a desired constituent of the reaction mass since its presence tends to facilitate contact between the ferricyanide and the impurities to be destroyed.

It is generally desirable to effect treatment of the meta- or ortho-phenylenediamine with ferricyanide in the presence of water, which may be added with the phenylenediamine or the ferricyanide (both as gross water or water of hydration). It is preferable for the total amount of water to correspond to a 10 to 90% by weight solution of phenylenediamine, about 50% by weight phenylenediamine solution being optimum.

Reaction temperatures may range broadly from about 30 to 150° C. It is preferred that the reaction temperature range be from 70 to 130° C. The reaction pressure is not critical and is normally atmospheric, but where it is necessary the reaction pressure may be otherwise. For example, superatmospheric reaction pressure may be required when operating at elevated temperatures to prevent volatilization loss of reaction mixture components. Reaction time may vary from minutes to hours depending on the temperature, the quality of the starting phenylenediamine, the quantity of ferricyanide utilized, and the result desired.

Representative examples illustrating the present invention are as follows. Isomer contents of the impure phenylenediamine samples as described below are conveniently determined by vapor phase chromatography. All parts are by weight unless otherwise specified.

EXAMPLE I

One hundred and twenty parts by weight of color-unstable m-phenylenediamine containing 0.22 mole percent p-phenylenediamine and substantially nil o-phenylenediamine were heated to and maintained molten at 80° C., and, which being agitated, were treated with potassium ferricyanide in the amounts tabulated below contained in 20 parts by weight water. The potassium ferricyanide solution was added over a 5-minute period, after which time the reaction mass was held under agitation at about 80° C. for an additional 55 minutes. Thereafter, the reaction mixture was distilled at a reduced pressure of 10–20 mm. of Hg to a final still-pot temperature of 200° C. The reaction mass water distilled first, then sustantially pure m-phenylenediamine was collected as distillate. The distilled pure m-phenylenediamine product boiled at 150 to 170° C. depending on the pressure and solidified to a white crystalline mass having a freezing point of at least 62.7° C. (usually 62.8–62.9° C.). The pure crystalline m-phenylenediamine solid obtained has other properties as indicated in Table I below.

Storage stability of m-phenylenediamine is conveniently determined according to the following method: A dry distilled sample is exposed to atmospheric conditions at 55° C. for 5 hours. The sample is removed and the change in color determined, as by visual inspection, for example. The change in color of the sample is indicative of the extent of deterioration under the above conditions of the test. The color of freshly distilled m-phenylenediamine is water-white. The smaller the change in color, the more stable the material. As a more objective test, the change in color was rated by using a number scale of 0–5 in which 0 corresponds to white and 5 to a very dark grey.

TABLE I.—PURIFICATION OF m-PHENYLENEDIAMINE (MPD) BY FERRI-CYANIDE TREATMENT AT 80° C.

[Impurity before treatment=0.22 mole percent]

| Test | Quantity of Ferricyanide Utilized | | | Percent Impurity in MPD After Treatment | Color Stability Rating* |
|---|---|---|---|---|---|
| | Parts Ferricyanide per 100 parts MPD | Wt. Ratio of Ferricyanide to Impurity | Mole of Ferricyanide per Mole of Impurity | | |
| A | 0 | 0 | 0 | 0.14 | 4.0 (Grey). |
| B | 0.66 | 3 | 1 | 0.05 | 1.0 (Off-White). |
| C | 2.6 | 12 | 4 | 0.05 | Do. |
| D | 6.6 | 30 | 10 | 0.03 | Do. |

*The color rating of the freshly distilled MPD sample before starting the accelerated storage test was water-white.

The data show that the untreated control A is partially purified by distillation but is relatively unstable, tending to deteriorate to an objectionable degree in storage, as indicated by the color change. Tests B, C and D show that m-phenylenediamine treated according to the method of this invention has greater purity as measured by its isomer content and greater resistance to discolor and deteriorate as indicated by its resistance to color change under conditions conducive to deterioration.

EXAMPLE II

Test A

One hundred and fifty grams of color unstable ortho-phenylenediamine, composed of 0.25% para-phenylenediamine, 0.34% meta-phenylenediamine and 99.4% ortho-phenylenediamine was dissolved in 100 g. of water and heated to and maintained at 80° C. with agitation. A solution of 9.1 g. of potassium ferricyanide (8 moles ferricyanide/mole para-phenylenediamine based on the vapor phase chromatography analysis) in 50 grams of water was added to the hot phenylenediamine water solution. Temperature was maintained at 80° C. for ½ hour with agitation. After ½ hour, agitation was stopped and the water was removed by distillation under reduced pressure (53° C. at 100 mm. Hg) until the pot temperature reached approximately 135–140° C. The pressure was slowly reduced to 50 mm. and 10 mm. Hg, respectively, to remove traces of water as the pot temperature was allowed to decrease. After the water was removed, heat was again applied and the remaining material distilled at a reduced pressure of 10 mm. Hg to a final still pot temperature of 150° C. The substantially pure ortho-phenylenediamine was collected as distillate. The ortho-phenylenediamine distillate was found to boil at 135–136° C. and solidify to a white crystalline mass. The analysis of the reduction of p-isomer content in the ortho-phenylenediamine of this example by the above-described treatment is indicated in Table III below.

For purposes of comparing the storage stability of the above ferricyanide treated sample with that of a control sample, another test was made by following the procedure as outlined above except that the ferricyanide treatment was omitted. The results of the storage stability properties of the control product are compared below in Table II with the storage stability properties of the starting material after treatment with ferricyanide.

Storage stability of the samples prepared in Test A is conveniently determined in the following manner: The freshly distilled material is stored under atmospheric conditions of moisture and air in a bottle (both treated and control materials bottled at the same time) which was stored at 24–25° C. for 1 day, 35° C. for 1 day, 40°

C. for 2 days and finally returned to 25° C. for 3 days. The change in color with time was rated by using a number scale of 0–5 in which the 0 corresponds to white and the 5 to a very dark grey.

TABLE II.—STORAGE STABILITY OF FERRICYANIDE TREATED ORTHO-PHENYLENEDIAMINE

|  | Percent Ortho-Phenylenediamine | Percent Para-Phenylenediamine | Percent Meta-Phenylenediamine | Color Stability Rating* |
| --- | --- | --- | --- | --- |
| Starting Material | 99.40 | 0.25 | 0.34 | 4.5 in <1.0 day. |
| Ferricyanide Treated | 99.94 | 0.02 | 0.05 | 1.0 in >7.0 days. |
| Untreated Control | 99.70 | 0.14 | 0.15 | 4.5 in 7.0 days. |

*The color rating of the starting materials before starting the accelerated storage test was water-white.

Test B

A similar experiment was carried out as described in Test A with a different batch of ortho-phenylenediamine. This material contained 98.50% ortho-phenylenediamine, 0.08% para-phenylenediamine and 1.4% meta-phenylenediamine. The same techniques and weights of ortho-phenylenediamine were used except that in this case 1.46 g. of potassium ferricyanide (4 moles ferricyanide/mole para-phenylenediamine) was used and the reaction was allowed to proceed for 1 hour instead of ½ hour. The results showing the reduction of isomeric impurities in the ortho-phenylenediamine for this treated sample are also shown below in Table III.

Test C

A sample of phenylenediamine composed of 99.72% meta-phenylenediamine, 0.22% para-phenylenediamine and 0.06% ortho-phenylenediamine was treated in a manner similar to the procedure described in Test A using 4 moles of ferricyanide/mole para-phenylenediamine impurity. Isolation techniques, similar to those in the above examples, were used to separate the meta-phenylenediamine from the reaction mixture.

A sample of phenylenediamine was also treated in accordance with the procedure of this example except the ferricyanide treatment was omitted.

The reduction of the para-phenylenediamine content in the treated meta-phenylenediamine is also shown below in Table III.

TABLE III.—REDUCTION OF p-PHENYLENEDIAMINE CONTAMINANT FROM PHENYLENEDIAMINE SOLUTIONS

|  | Starting Material | Ferricyanide Treated | Untreated control |
| --- | --- | --- | --- |
| Test A: |  |  |  |
| Percent Ortho-Phenylenediamine | 99.40 | 99.94 | 99.7 |
| Percent Para-Phenylenediamine | 0.25 | 0.02 | 0.14 |
| Percent Meta-Phenylenediamine | 0.34 | 0.05 | 0.15 |
| Test B: |  |  |  |
| Percent Ortho-Phenylenediamine | 98.50 | 99.82 |  |
| Percent Para-Phenylenediamine | 0.08 | 0.006 |  |
| Percent Meta-Phenylenediamine | 1.40 | 0.174 |  |
| Test C: |  |  |  |
| Percent Ortho-Phenylenediamine | 0.07 | 0.06 | 0.06 |
| Percent Para-Phenylenediamine | 0.22 | 0.09 | 0.206 |
| Percent Meta-Phenylenediamine | 99.71 | 99.85 | 99.72 |

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A process for purifying a phenylenediamine contaminated with from 0.01 to 1 mole percent para-phenylenediamine which process comprises intimately contacting said phenylenediamine in the liquid phase at a temperature range of from about 30° C. to 150° C. with a member selected from the group consisting of a water-soluble Group I–A metal ferricyanide and a water-soluble Group II–A metal ferricyanide in an amount from about 0.5 to 10 moles of said ferricyanide for each mole of said para-phenylenediamine impurity, and then recovering the resultant purified phenylenediamine from the mixture.

2. The process of claim 1 wherein the temperature range is from 70° C. to 130° C.

3. The process of claim 1 wherein the purified phenylenediamine is recovered from the mixture by distillation.

4. A process for purifying m-phenylenediamine contaminated with from 0.05 to 0.5 mole percent p-phenylenediamine which process comprises intimately contacting said m-phenylenediamine in the liquid phase at a temperature range of from about 30° C. to 150° C. with a member selected from the group consisting of a water-soluble Group I–A metal ferricyanide and a water-soluble Group II–A metal ferricyanide in an amount from about 0.5 to 10 moles of the ferricyanide for each mole of said p-phenylenediamine impurity, and then recovering the resultant purified m-phenylenediamine from the mixture.

5. A process for purifying o-phenylenediamine contaminated with from 0.05 to 0.5 mole percent p-phenylenediamine which process comprises intimately contacting said m-phenylenediamine in the liquid phase at a temperature range of from about 30° C. to 150° C. with a member selected from the group consisting of a water-soluble Group I–A metal ferricyanide and a water-soluble Group II–A metal ferricyanide in an amount from 0.5 to 10 moles of the ferricyanide for each mole of said p-phenylenediamine impurity, and then recovering the resultant purified o-phenylenediamine from the mixture.

6. A process for purifying a phenylenediamine contaminated with from 0.05 to 1 mole percent p-phenylenediamine which process comprises intimately contacting said phenylenediamine in the liquid phase at a temperature range of from about 30° C. to 150° C. with a water-soluble Group I–A metal ferricyanide in an amount of from 1 to 4 moles for each mole of said p-phenylenediamine impurity, and then recovering the resultant purified phenylenediamine from the mixture.

7. A process for purifying a phenylenediamine contaminated with from 0.05 to 1 mole percent p-phenylenediamine which process comprises intimately contacting a 10% to 90% water solution of said phenylenediamine at a temperature range of from about 30° C. to 150° C. with a member selected from the group consisting of a water-soluble Group I–A metal ferricyanide and a water-soluble Group II–A metal ferricyanide in an amount from about 0.5 to 10 moles of said ferricyanide for each mole of said p-phenylenediamine impurity, and then recovering the resultant purified phenylenediamine from the mixture.

8. A process for purifying a phenylenediamine containing 0.05 to 1 mole percent p-phenylenediamine which process comprises intimately contacting said phenylenediamine in the liquid phase at a temperature range of from about 30° C. to 150° C. with a member selected from the group consisting of a water-soluble Group I–A metal ferricyanide and a water-soluble Group II–A metal ferricyanide in an amount from about 0.05 to 5 moles of said metal ferricyanide per 100 moles of said phenylenediamine, and then recovering the resultant purified phenylenediamine from the mixture.

References Cited
UNITED STATES PATENTS

| | | | |
|---|---|---|---|
| 2,165,165 | 7/1939 | Dreisbach et al. | 260—582 |
| 2,946,821 | 7/1960 | Schenck et al. | 260—582 |

CHARLES B. PARKER, *Primary Examiner.*

N. WICZER, *Assistant Examiner.*